United States Patent
Mohar Castillo et al.

(10) Patent No.: US 12,407,800 B2
(45) Date of Patent: Sep. 2, 2025

(54) PROJECTOR ARRANGEMENT FOR A VEHICLE

(71) Applicant: Ford Global Technologies, LLC, Dearborn, MI (US)

(72) Inventors: María Fernanda Mohar Castillo, Atizapán de Zaragoza (MX); Ligia Olivares Espinosa, Atizapán de Zaragoza (MX); Emiliano Reyes Pardo, Mexico City (MX); Gabriel Pérez Trueba, Atizapán de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 17/883,084

(22) Filed: Aug. 8, 2022

(65) Prior Publication Data

US 2024/0048674 A1 Feb. 8, 2024

(51) Int. Cl.
| | |
|---|---|
| *H04N 9/31* | (2006.01) |
| *B60R 11/02* | (2006.01) |
| *E05B 85/12* | (2014.01) |
| *B60R 11/00* | (2006.01) |

(52) U.S. Cl.
CPC ....... *H04N 9/3173* (2013.01); *B60R 11/0229* (2013.01); *E05B 85/12* (2013.01); *B60R 2011/0021* (2013.01); *B60R 2011/0059* (2013.01)

(58) Field of Classification Search
CPC .......... E05B 85/02; E05B 85/10; E05B 85/12; H04N 9/3141; H04N 9/3173; B60R 2011/0021; B60R 2011/0059; B60R 11/00; B60R 11/0229
See application file for complete search history.

(56) References Cited

U.S. PATENT DOCUMENTS

| | | | |
|---|---|---|---|
| 7,802,835 B2 | 9/2010 | Vitito | |
| D691,584 S | 10/2013 | Nussbaum et al. | |
| 9,272,708 B2 | 3/2016 | Cuddihy et al. | |
| 9,604,568 B1 * | 3/2017 | Salter | B60Q 1/247 |
| 9,922,583 B1 * | 3/2018 | Moe | G09F 21/04 |
| 10,174,542 B1 * | 1/2019 | Ramakrishnan | E05F 15/76 |
| 10,207,623 B1 | 2/2019 | Hemphill et al. | |
| 10,286,798 B1 | 5/2019 | Penilla et al. | |

(Continued)

FOREIGN PATENT DOCUMENTS

CN 101169578 A 4/2008

OTHER PUBLICATIONS

All in one projector and fold up screen carrying box—Google Search.
Insignia™ Complete Outdoor Projector Kit.

*Primary Examiner* — Sultan Chowdhury
(74) *Attorney, Agent, or Firm* — Vichit Chea; Price Heneveld LLP (57) ABSTRACT

A projector arrangement for a vehicle includes an attachment mechanism that selectively couples with a rear door of the vehicle. The projector arrangement further includes a video projector coupled with the attachment mechanism. The video projector is configured to project image data in a direction toward the vehicle when the rear door is in an open position. A portable container selectively houses the attachment mechanism and the video projector.

20 Claims, 4 Drawing Sheets

(56) References Cited

U.S. PATENT DOCUMENTS

| | | |
|---|---|---|
| 10,393,415 B1 | 8/2019 | Partee et al. |
| 10,394,112 B2 | 8/2019 | Johnson et al. |
| 2003/0081184 A1* | 5/2003 | Li .......................... G03B 21/10 |
| | | 353/79 |
| 2004/0189947 A1 | 9/2004 | Hattori et al. |
| 2006/0268233 A1 | 11/2006 | Sato |
| 2008/0025544 A1 | 1/2008 | Maldonado |
| 2008/0037813 A1 | 2/2008 | Entner |
| 2009/0268164 A1 | 10/2009 | Bowden et al. |
| 2012/0294550 A1 | 11/2012 | Hassman et al. |
| 2015/0108299 A1* | 4/2015 | Seal ..................... F16M 13/022 |
| | | 248/205.1 |
| 2018/0304820 A1 | 10/2018 | Johnson et al. |
| 2020/0386031 A1* | 12/2020 | Tsunekawa .......... G06V 10/255 |

\* cited by examiner

PROJECTOR ARRANGEMENT FOR A VEHICLE

FIELD OF THE DISCLOSURE

The present disclosure generally relates to a projector arrangement for a vehicle and, more particularly, to a portable projector arrangement that selectively couples with a rear door of a vehicle.

BACKGROUND OF THE DISCLOSURE

Conventional vehicles typically include infotainment systems and/or entertainment accessories. These infotainment and entertainment systems have advanced over time to allow consumers to experience media in various ways. For example, conventional vehicles may include flip down display screens for displaying video.

Typically, consumers are required to install these aftermarket display assemblies or purchase separate and incompatible display systems for a given vehicle. In addition, if a projection device is implemented in a vehicle, structures of the vehicle cabin may be required to be rearranged to limit obstruction of the video projection.

SUMMARY OF THE DISCLOSURE

According to a first aspect of the present disclosure, a projector arrangement for a vehicle includes an attachment mechanism selectively coupling with a rear door of the vehicle. The projector arrangement further includes a video projector coupled with the attachment mechanism. The video projector is configured to project image data in a direction toward the vehicle when the rear door is in an open position.

Embodiments of the first aspect of the disclosure can include anyone or a combination of the following features:
- the attachment mechanism including at least one clip configured to engage a handle of the rear door;
- the attachment mechanism including at least one elongate member extending between the video projector and the at least one clip;
- the at least one clip including a first clip corresponding to a first elongate member and the second clip corresponding to a second elongate member, the first and second elongate members laterally spacing the video projector from the handle when the attachment mechanism is coupled to the rear door;
- the handle and the clip forming a snap-fit connection;
- a screen and at least one bracket configured to couple the screen with the vehicle proximate to a rear opening of the vehicle closed by the rear door in a closed position;
- the at least one bracket including a plurality of brackets, and the plurality of brackets configured to secure the screen in a planar configuration;
- each of the plurality of brackets including a first hook configured to engage a wall of the vehicle;
- the screen defining a plurality of holes disposed proximate to a periphery of the screen, and each of the plurality of brackets including a second hook opposite the first hook configured to engage one of the plurality of holes;
- a portable container configured to house the video projector and the attachment mechanism;
- the portable container including a solar cell disposed on an exterior surface of the container, and the solar cell configured to provide electrical power to the video projector;
- at least one speaker selectively housed in the portable container, and in the solar cell being further configured to provide electrical power to the at least one speaker; and
- a wireless communication module coupled with the video projector and configured to communicate with the user interface that controls the image data to be projected via the video projector.

According to a second aspect of the present disclosure, a vehicle includes a rear door rotatable between a closed position and an open position. A video projector arrangement includes an attachment mechanism and a video projector. The attachment mechanism selectively couples with the rear door. The video projector is coupled with the attachment mechanism and is configured to project image data in a direction toward the vehicle when the rear door is in the open position.

Embodiments of the second aspect of the disclosure can include any one or a combination of the following features:
- a handle extending from a vehicle interior surface of the rear door, the attachment mechanism including at least one clip configured to engage the handle;
- the attachment mechanism including at least one elongate member extending between the video projector and the at least one clip; and
- the projector arrangement including a screen and at least one bracket configured to couple the screen with the vehicle proximate to a rear opening of the vehicle closed by the rear door in the closed position.

According to a third aspect of the present disclosure, a projector arrangement for a vehicle includes an attachment mechanism that selectively couples with the rear door of the vehicle. The attachment mechanism includes a clip and an elongate member. The projector arrangement further includes a screen and at least one bracket configured to couple the screen with the vehicle proximate to a rear opening of the vehicle closed by the rear door in a closed position. A video projector is coupled with the clip via the elongate member. The video projector is configured to project image data onto the screen when the rear door is in an open position.

Embodiments of the third aspect of the disclosure can include any one or a combination of the following features:
- at least one speaker, the attachment mechanism, the screen, and the video projector, and the at least one speaker each being configured to be housed in a portable container in a stored position, the portable container including a solar cell configured to charge the video projector and the at least one speaker.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
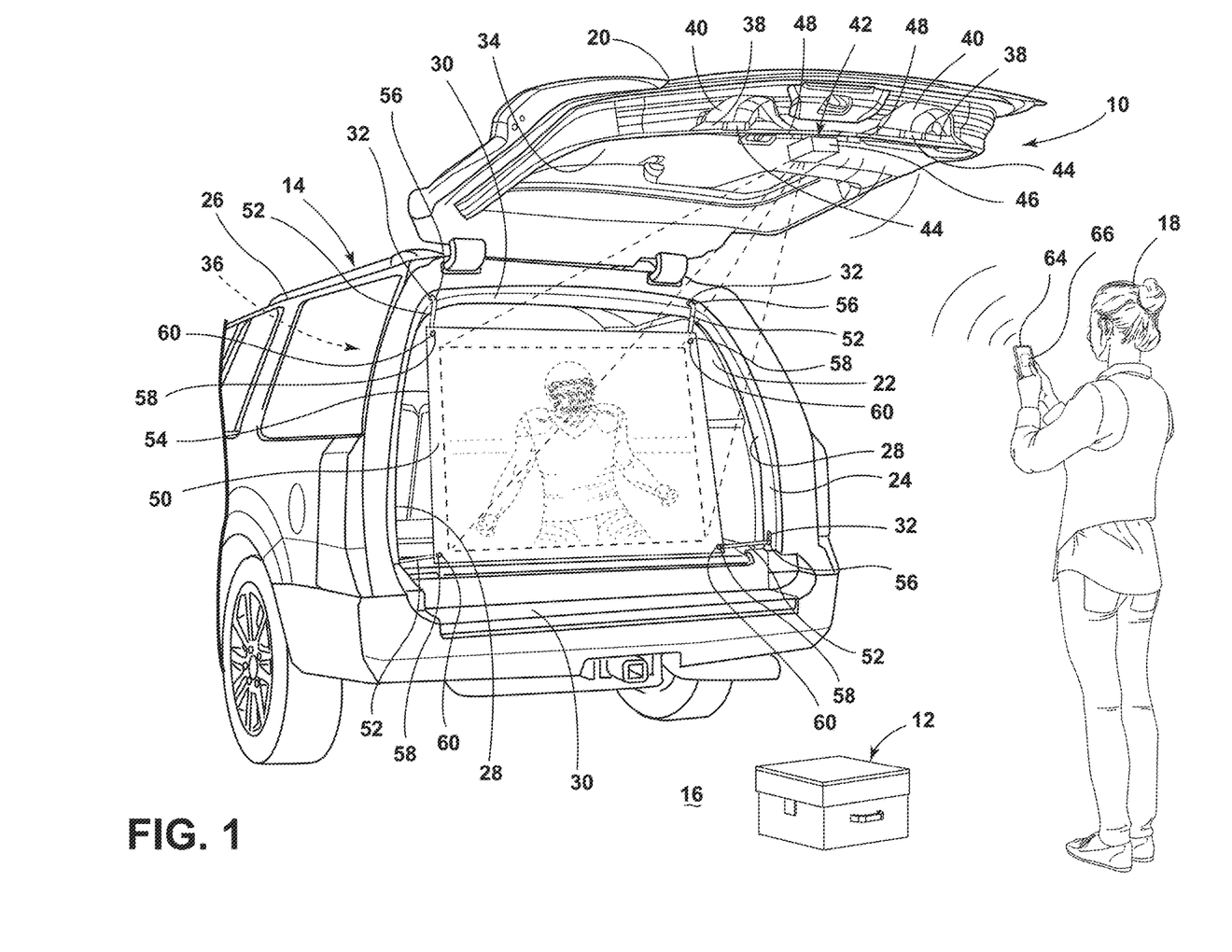
FIG. 1 is a rear perspective view of a vehicle incorporating the projector arrangement at a rear opening of the vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a projector arrangement for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-4, the present disclosure relates to a projector arrangement 10 that may enhance a user experience of viewing cinema or the like in an environment around a vehicle 14. The projector arrangement 10 may be portable via a kit 12 and be configured to selectively couple with a structure of the vehicle 14. For example, the projector arrangement 10 may be removed from the kit 12 and mounted to the vehicle 14. Video projected from the projector apparatus may be viewed from an exterior 16 of the vehicle 14 when a rear door of the vehicle 14 is in an open state, as will be further described herein. The present projector arrangement 10 may allow for less cumbersome steps to be performed by users 18 by, for example, not requiring rearrangement of the vehicle cabin or portions thereof. The portable kit 12 may be stored in the vehicle 14 and removed by the user 18 when the vehicle 14 is stationary, and the portable kit 12 may include the attachments required to provide an enhanced experience. For example, the kit 12 may include various sub-compartments to store the projection equipment, such as audio devices, video devices, stands, panels, screens, and the like, as well as trays or other utensils for holding food items to be consumed by the user 18. As will be described further herein, the kit 12 may also operate as a charging station or an electrical storage device that is capable of being powered or charged via a solar panel disposed on the kit 12. In this way, the projector arrangement 10 of the present disclosure may provide for a more enjoyable viewing experience by limiting incompatibility issues with physical features of the vehicle 14, limiting assembly time, and/or requiring little to no rearrangement of the interior of the vehicle 14.

Referring now more particularly to FIG. 1, the vehicle 14 includes a rear door 20 that is pivotable between an open position (as illustrated) and a closed position to selectively cover, or close, a rear opening 22 of the vehicle 14. The vehicle 14 includes a chassis, or a frame 24, that includes an overhead panel 26 and one or more upright framing features 28 and lateral framing features 30 that may define the rear opening 22. As will be described further herein, the supports 28, 30 may define one or more slots 32 for receiving hanging parts that support at least a portion of the projector arrangement 10.

Still referring to FIG. 1, the rear door 20 includes an interior surface 34 that, in the closed position, closes off an interior 36 of the vehicle 14. The rear door 20 may include one or more handles 38 that may be held by the user 18 to control opening or closing of the rear door 20. The handles 38 may be a single handle, a pair of handles 38 (as illustrated), or more than a pair of handles 38 that allow the user 18 to shut the rear door 20. Notches 40 may be formed on the rear door 20 and extend into the interior surface 34 to allow user manipulation of the rear door 20 via the handles 38 and further define an area for the handles 38. It is contemplated that the handles 38 may be contoured or have a particular curvature or geometry that is configured to mate with at least a portion of the projector arrangement 10.

For example, the projector arrangement 10 may include an attachment mechanism 42 that selectively couples with the pair of handles 38 of the rear door 20 via a pair of clips 44. A video projector 46 may be coupled with the attachment mechanism 42 to allow the video projector 46 to project image data in a direction toward the vehicle 14 when the rear door 20 is in the open position. The attachment mechanism 42 may include a pair of elongate members 48, or supports, that each extend from one of the pair of clips 44 toward the video projector 46, such that the video projector 46 may be centrally mounted between the clips 44. The clips 44 and the handles 38 may form a snap-fit connection, such that the clips 44 may be dimensioned slightly more narrowly than the handles 38 to allow the clips 44 to be secured to the handles 38 upon the user 18 applying pressure to the clips 44. Similarly, the clips 44 may be removed by applying a similar or different pressure outwardly from the rear door 20 to remove the clips 44 from the handles 38. In this way, the video projector 46 selectively couples with rear door 20 to allow an attached configuration and a detached configuration of the video projector 46.

With continued reference to FIG. 1, the projector arrangement 10 may include a projector screen 50 that selectively couples with the vehicle 14 via a plurality of brackets 52 disposed along a periphery 54 of the projector screen 50 when the projector screen 50 is mounted to the vehicle 14. For example, each bracket 52 may include a first hook 56 and a second hook 58 spaced from and opposing one another. The first hook 56 may engage a wall, or the frame 24, of the vehicle 14, and the second hook 58 may engage or couple with the screen 50. The second hook 58 may be secured with the projector screen 50 via a plurality of holes 60 formed along the periphery 54 of the projector screen 50. For example, as illustrated, holes 60 may be disposed about four corners of the projector screen 50, which may form a generally square shape when coupled with the vehicle 14. The brackets 52 may allow the projector arrangement 10 to hang from the frame 24 of the vehicle 14 and/or may provide tension to the screen to hold the screen in a generally planar configuration when the projector screen 50 is coupled with the vehicle 14. For example, brackets 52 along lower parts of the screen 50 may extend laterally or at an oblique angle to hold tension laterally and/or vertically on the screen 50.

Still referring generally to FIG. 1, the user 18 of the projector arrangement 10 may control the projector 46 remotely via an interface 66 on a mobile device 64 or an interface associated with the vehicle 14 (e.g., a vehicle human-machine interface (HMI)). For example, the projector arrangement 10 may include a wireless communication module that is configured to communicate with a wireless communication module of the mobile device 64 over a network. The network may be a wireless network, such as the Internet, and may operate with various wired or wireless protocols, such as TCP/IP, 3G, 4G, SMS, Wi-Fi, Bluetooth, Zigbee, or the like to allow the user 18 to select cinema (e.g., movies, shows, and the like) to be streamed on the phone. That video data may be transmitted by the projector 46 toward the projector screen 50 and audio associated with the video data to be presented on an audio communication device, such as vehicle speakers, Bluetooth speakers, or speaker devices further described herein. As will also be further described herein, the projector arrangement 10 may be coupled with an electrical power source when the sub-assembly (e.g., the projector 46 and attachment mechanism 42) is attached with the rear door 20 and/or may be powered from a chargeable power device, such as an electrochemical cell (e.g., a battery).

Figure 2A:
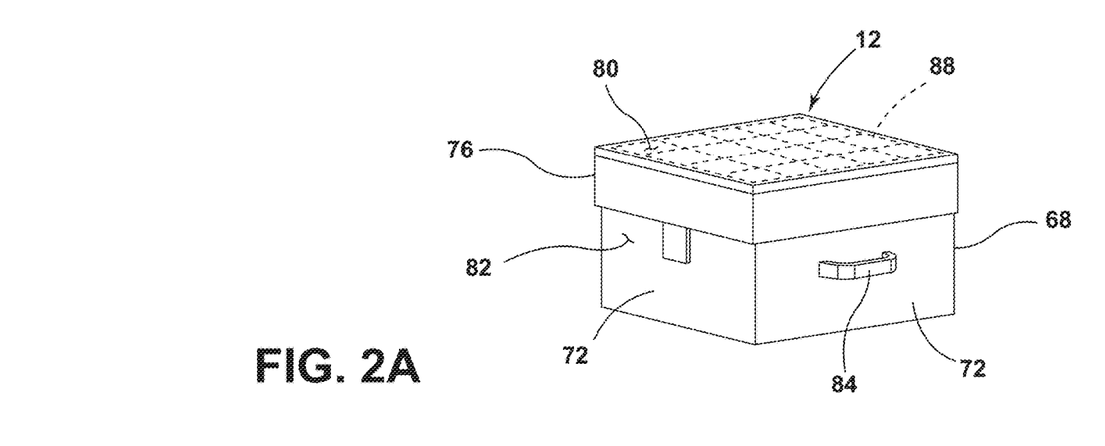
FIG. 2A is a perspective view of a portable container according to one aspect of the present disclosure.
Figure 2B:
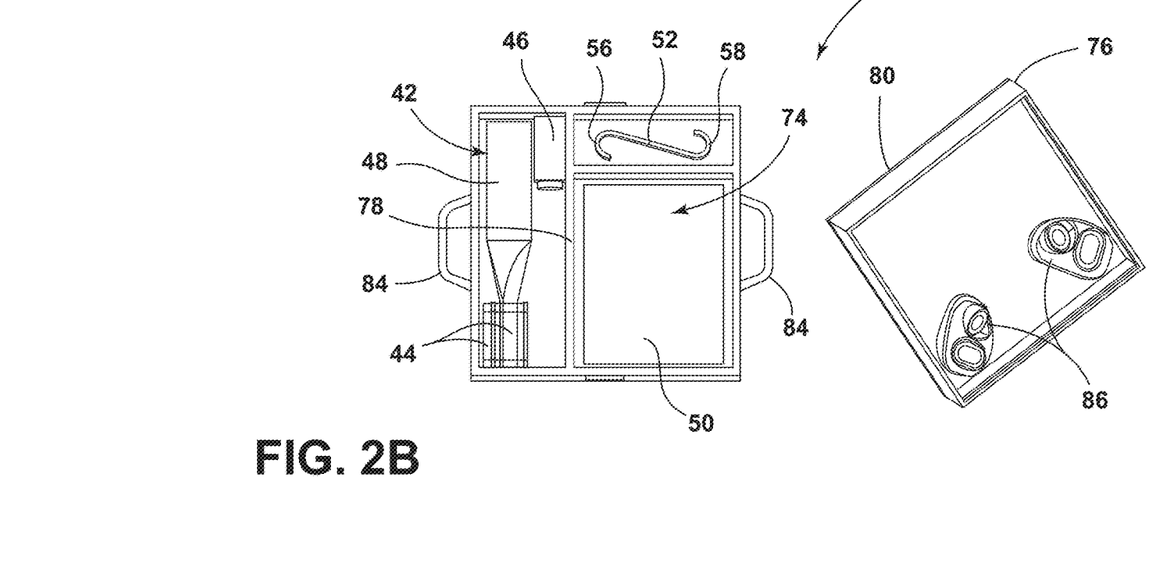
FIG. 2B is a partially disassembled view of the container of FIG. 2A.

Referring now to FIGS. 2A and 2B, the kit 12 may be configured to store various features of the projector arrangement 10 in a container 68 that is portable (e.g., movable). For example, the video projector 46, the attachment mechanism 42, the brackets 52, and the screen 50 may each be storable within various portions of the container 68. Referring more particularly to FIG. 2A, the container 68 may include a plurality of sidewalls 72 and a bottom wall (not shown) that couples with the sidewalls 72 to form a cavity 74 within the container 68 for storing various features of the projector arrangement 10. The container 68 also includes a cover 76 that may be pivotable about one of the sidewalls 72 or may be removable from the sidewalls 72. In general, the container 68 may be removed from the vehicle 14 and placed outside of the vehicle 14 in a viewing area (e.g., behind the vehicle 14 in the exterior 16) for viewing a video or other images from image data projected onto the projector screen 50 when the projector arrangement 10 is coupled with the vehicle 14. Inside the container 68, for example, a tray 78, or various sub-compartments of the cavity 74 may be employed for housing food items and/or other contents (e.g., 3D glasses) that may enhance a viewing experience.

Referring now to FIGS. 2A and 2B more generally, a solar panel 80 may be provided on an exterior surface 82 of the container 68. As exemplarily illustrated, the solar panel 80 is coupled with or integrated with a top portion (e.g., cover 76) of the container 68 in order to provide a greater surface area for capturing solar energy than incorporating the solar panel 80 on the sidewalls 72 of the container 68. A pair of clasps 84 extend from an opposing pair of sidewalls 72 to allow the user 18 to manipulate the clasps 84 to lift the container 68 and carry the container 68 to/from the vehicle 14. The lid 76 may define a pair of indentations on an underside of the lid 76 that receive at least one speaker 86 configured to output audio associated with video data transmitted by the projector 46. These speakers 86 may be secured to the top portion or in the cavity 74 when the projector arrangement 10 is disassembled and in the stored configuration.

With continued reference to FIGS. 2A and 2B, the solar panel 80 may include one or more solar cells 88 that are configured to convert solar energy into electrical energy. The electrical energy produced by the one or more solar cells 88 may be converted by an electrical conversion device in the container 68 to a direct-current or alternating current voltage that may be used to charge or power the video projector 46 and/or the speakers 86. For example, the electrical power may be configured to be output or available for output as a low DC voltage (e.g., 12V, etc.) and/or 115 VAC-120 VAC. Accordingly, an electrical interface may be provided in the container 68 for coupling cords and/or wires between the interface and the video projector 46 or the speakers 86 to charge a battery associated with either or both of the video projector 46 and the speakers 86. In some examples, the video projector 46 and/or the speakers 86 may be charged wirelessly (via, e.g., wireless induction charging), thereby allowing minimal or reduced involvement of the user 18 with plugging or interconnecting wires from a wall of the container 68 with the subcomponents of the projector arrangement 10.

Figure 3:
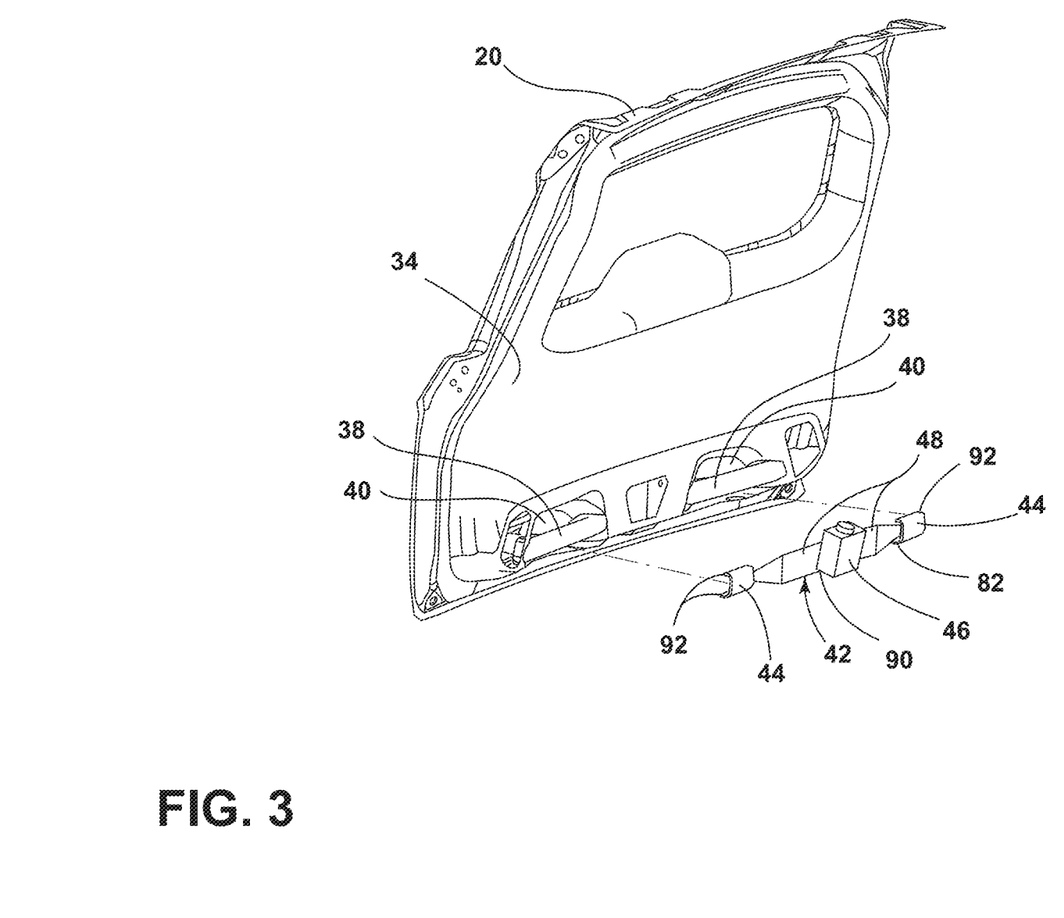
FIG. 3 is a perspective view of a video projector detached from a rear door of a vehicle according to one aspect of the present disclosure.

Referring now to FIG. 3, the video projector 46 may be configured to mount to the pair of elongate members 48 at a central portion 90 of the subassembly 42, 46. In general, each elongate member 48 may extend from the central portion 90 and taper toward ends of the elongate member 48 or an end of the elongate member 48 at the clip 44. As exemplarily illustrated, each clip 44 may include a pair of opposing latch portions 92 that may deflect away from one another upon pressure being exerted on a back surface of the clip 44 when the clip 44 engages the handle 38. The deflection of the latch members 92 may cause the latch members 92 to be biased toward one another, such that when the clip 44 engages in the handles 38, the latch members 92 deflect toward one another within the notch 40 to secure the clips 44 with the handles 38. In some examples, a coupling of the pair of elongate members 48 with one another may include a hinged portion, such that the elongate members 48 are secured to one another in both the attached and detached configurations. In other examples, the projector 46 mounts to an intermediate plate that is configured to receive each of the elongate members 48. Additionally, or alternatively, the elongate members 48 and the pair of clips 44 may extend along a radius of curvature or a plurality of radii of curvatures to match or otherwise abut the rear door 20 along a similar contour of the rear door 20. For example, the elongate members 48 may bow inwardly from the clips 44 toward the projector 46 to reflect the contour of the interior surface 34 and the handles 38 to "hug" the handles 38, though this example is non-limiting and other configurations, shapes, and contours of the attachment mechanism 42 may be employed. In the example illustrated, the contour may allow the subassembly 42, 46 to have a relatively low profile, such that the rear opening 22 is not substantially blocked (e.g., blocking user interaction with the rear opening 22) by the projector 46 when the rear door 20 is in the open position.

Figure 4:
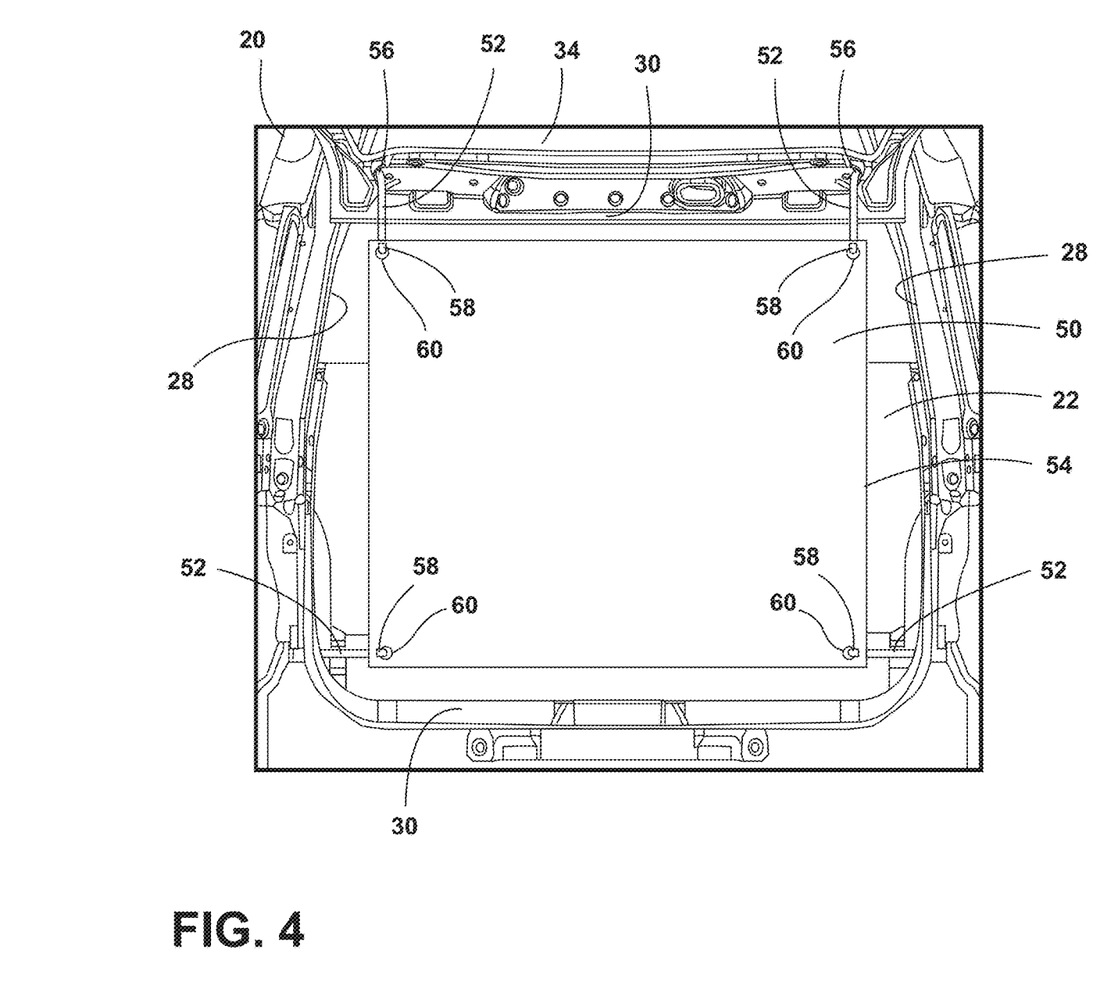
FIG. 4 is a front view of a projector screen coupled with a vehicle adjacent a rear opening of the vehicle according to one aspect of the present disclosure.

Referring now to FIG. 4, the projector screen 50 may be hung or otherwise secured to the walls of the vehicle 14 (e.g., the frame 24) via the plurality of brackets 52 previously described in relation to FIG. 1. As shown in FIG. 4, the plurality of brackets 52 may be embodied as S— hooks, with the first hook 56 securing to a flange or other surface of the frame 24. It is contemplated that the first hook 56 of the brackets 52 may engage the apertures as previously described or may engage a ledge, flange, or another surface that protrudes to allow hanging of the bracket 52. As depicted, the projector screen 50 may cover a substantial portion of the rear opening 22 when in the attached configuration and may also face a vehicle-rearward direction of a passenger compartment of the vehicle 14, thereby allowing minimal or reduced manipulation of the interior 36 to couple the projector screen 50 with the vehicle 14 and use the projector arrangement 10.

In general, the projector arrangement 10 of the present disclosure may be generally configured for a plurality of models of vehicles or may be specifically configured for a particular vehicle model, such the interaction of the clips 44 of the handles 38 and/or the contour of the subassembly 42, 46 may be configured to be flush with the rear door 20. The projector arrangement 10 may also provide for a relatively simple installation and setup, and may also serve as an all-in-one audio and video connectivity interface. The projector arrangement 10 may allow for a significant user experience of cinema in an off-road environment, and may also allow for or be configured as a rechargeable system that is self-sufficient based on solar power. It is also contemplated that other powering sources for the rear projection apparatus may be incorporated to power and/or charge the video projector 46 and/or the speakers 86 of the present disclosure. Further, the projector arrangement 10 of the present disclosure may limit modification of the interior spaces and structures of the vehicle 14.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A projector arrangement for a vehicle, comprising:
an attachment mechanism selectively coupling with a rear door of the vehicle;
a video projector coupled with the attachment mechanism, the video projector configured to project image data in a direction toward the vehicle when the rear door is in an open position; and
a screen and at least one bracket configured to couple the screen with the vehicle proximate to a rear opening of the vehicle closed by the rear door in a closed position.

2. The projector arrangement of claim 1, wherein the attachment mechanism includes at least one clip configured to engage a handle of the rear door.

3. The projector arrangement of claim 2, wherein the attachment mechanism includes at least one elongate member extending between the video projector and the at least one clip.

4. The projector arrangement of claim 3, wherein the at least one clip includes a first clip corresponding to a first elongate member and a second clip corresponding to a second elongate member, the first and second elongate members laterally spacing the video projector from the handle when the attachment mechanism is coupled with the rear door.

5. The projector arrangement of claim 2, wherein the handle and the clip form a snap-fit connection.

6. The projector arrangement of claim 1, wherein the at least one bracket includes a plurality of brackets, wherein the plurality of brackets are configured to secure the screen in a planar configuration.

7. The projector arrangement of claim 6, wherein each of the plurality of brackets includes a first hook configured to engage a wall of the vehicle.

8. The projector arrangement of claim 7, wherein the screen defines a plurality of holes disposed proximate to a periphery of the screen, and wherein each the plurality of brackets includes a second hook opposite the first hook configured to engage one of the plurality of holes.

9. The projector arrangement of claim 1, further comprising:
a portable container configured to house the video projector and the attachment mechanism.

10. The projector arrangement of claim 1, wherein the portable container includes a solar cell disposed on an exterior surface of the container, the solar cell configured to provide electrical power to the video projector.

11. The projector arrangement of claim 10, further comprising at least one speaker selectively housed in the portable container, wherein the solar cell is further configured to provide electrical power to the at least one speaker.

12. The projector arrangement of claim 1, further comprising a wireless communication module coupled with the video projector and configured to communicate with a user interface that controls the image data to be projected via the video projector.

13. The projector arrangement of claim 1, wherein the image data includes at least one of images and video.

14. A vehicle, comprising:
a rear door rotatable between a closed position and an open position;
a projector arrangement including an attachment mechanism and a video projector, the attachment mechanism selectively coupling with the rear door, wherein the video projector is coupled with the attachment mechanism and is configured to project image data in a direction toward the vehicle when the rear door is in the open position, wherein the attachment mechanism includes at least one clip configured to engage a handle of the rear door.

15. The vehicle of claim 14, further comprising:
a handle extending from a vehicle interior surface of the rear door, wherein the attachment mechanism includes at least one clip configured to engage the handle.

16. The vehicle of claim 15, wherein the attachment mechanism includes at least one elongate member extending between the video projector and the at least one clip.

17. The vehicle of claim 15, wherein the handle and the clip form a snap-fit connection.

18. The vehicle of claim 15, wherein the projector arrangement includes a screen and at least one bracket configured to couple the screen with the vehicle proximate to a rear opening of the vehicle closed by the rear door in the closed position.

19. A projector arrangement for a vehicle, comprising:
an attachment mechanism selectively coupling with a rear door of the vehicle, the attachment mechanism comprising:
a clip; and
an elongate member;
a screen and at least one bracket configured to couple the screen with the vehicle proximate to a rear opening of the vehicle closed by the rear door in a closed position; and
a video projector coupled with the clip via the elongate member, the video projector configured to project an image onto the screen when the rear door is in an open position.

20. The projector arrangement of claim 19, further comprising:
at least one speaker, wherein the attachment mechanism, the screen, the at least one speaker, and the video projector are each configured to be housed in a portable container in a stored position, the portable container including a solar cell configured to charge the video projector and the at least one speaker.

* * * * *